Nov. 5, 1957    R. A. LEHRKE    2,812,380
CABLE PROTECTOR
Filed June 14, 1954
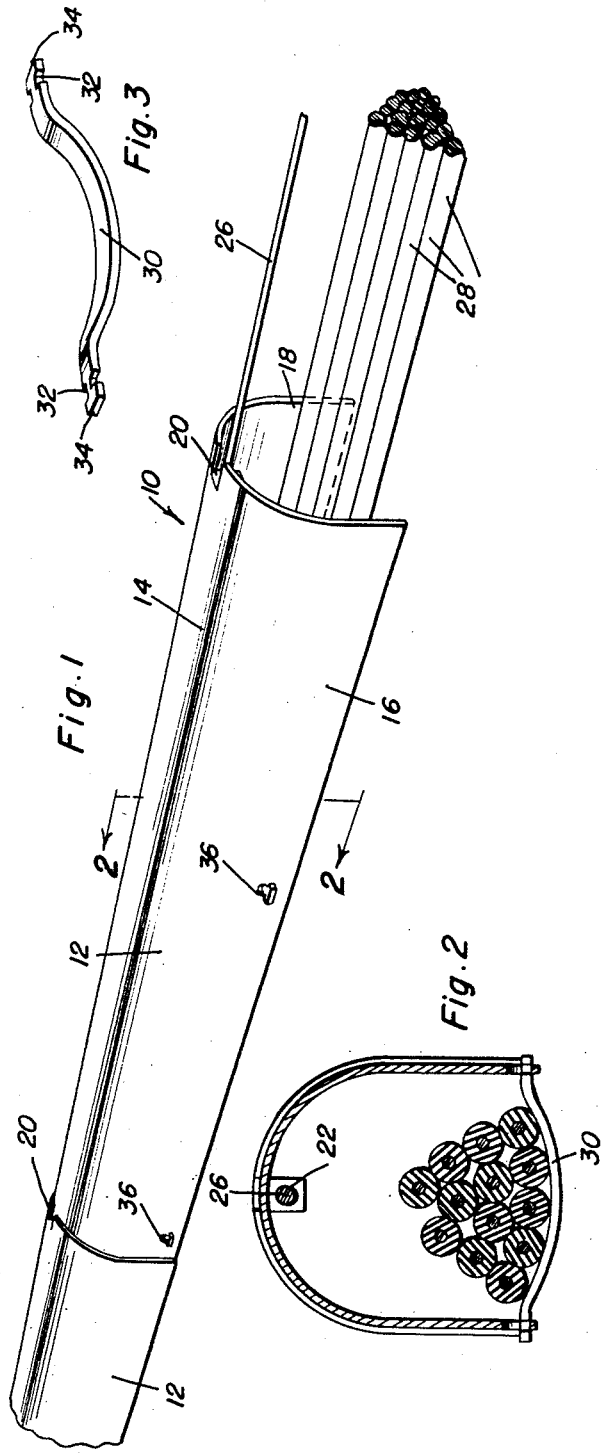
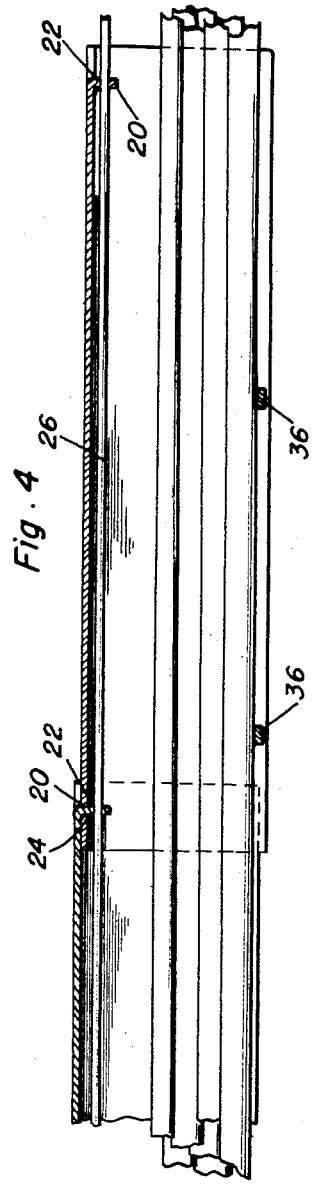
Roger A. Lehrke
INVENTOR.

United States Patent Office 2,812,380
Patented Nov. 5, 1957

2,812,380

CABLE PROTECTOR

Roger A. Lehrke, Atwater, Minn.

Application June 14, 1954, Serial No. 436,536

2 Claims. (Cl. 174—41)

This invention relates to a cable protector and has for its primary object the provision of protective means for unsheathed aerial cables from the effects of weather, sun and rain.

A further object of the invention is the provision of a cable protector wherein electrical conductors such as telephone, telegraph and low tension electric light and power lines as well as signal wires will be shielded and provided with optimum protection while at the same time being readily accessible for maintenance of the cables as necessary.

A further object of the invention resides in the provision of convenient means which will shield cables and simplify the connection of the cable to the messenger supporting the cable thereby facilitating installation of the cable.

One of the advantages of the utilization of the cable protector is that periodic painting of the cables will be eliminated while the necessity of including spare wires in the cable is eliminated due to the fact that additional wires may be at any time supported by the cable protector and incorporated with the cables without necessity of otherwise attaching the addition wire to the messenger.

Further objects and features of this invention reside in the provision of a cable protector that is strong and durable, constructed from sections so that the length of the protector may be varied according to the need, and which is not only light in weight but is relatively inexpensive to manufacture thereby permitting wide use and distribution.

These, together with the various ancillary objects and features of the invention will become apparent as the following description proceeds, are attained by this cable protector, a preferred embodiment of which has been illustrated in the accompanying drawings, by way of example only, wherein:

Figure 1 is a perspective view illustrating the cable protector in use;

Figure 2 is an enlarged vertical sectional view as taken along the plane of line 2—2 in Figure 1;

Figure 3 is a perspective view of one of the arcuate support members incorporated in this cable protector; and Figure 4 is a longitudinal sectional view of the cable protector showing the sections thereof in their overlapping interlocked relationship.

With continuing reference to the accompanying drawings wherein like reference numerals designate similar parts throughout the various views, reference numeral 10 generally designates the cable protector comprising the present invention. This cable connector 10 is made from a plurality of elongated shields 12 each of which are of substantially inverted U-shape in cross-section having upper arcuate interconnecting portions 14 integrally joining spaced sides 16 and 18.

The shields 12 have struck from the upper end edges as at 20 thereof lugs which are apertured as at 22 and which are adapted to extend through slots 24 formed in the other ends of the shields 14. Extending through the apertures 22 in the lugs 20 is a messenger cable 26 which is adapted to support the cable protector as well as to carry the non-supporting cables 28 such as telephone or telegraph wires, low tension power distribution lines and the like.

The non-self-sustaining cables 28 are supported by bowed arcuate supporting members 30 each of which have neck portions 32 of reduced dimensions as well as headed ends 34. The supporting members 30 extend into aligned apertures 36 formed at the center of each of the shield sections and adjacent one end thereof. The apertures 36 are of lesser diameter than that of the head 34 so that the portion of the shields 12 about the apertures 36 will engage within the neck portions 32 to lockingly hold the supporting members 30 in position. It is to be recognized that it is necessary to twist and otherwise move the supporting members 30 into the apertures 36 but this angular movement of the supporting members 30 will be further prevented by the weight of the cable 28 once the cables 28 are properly positioned.

Should it become necessary to add an additional wire to the cables 28, it is merely necessary to thread such a new wire within the confines of the shield sections 12 without otherwise affecting the existing arrangement.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A cable protector comprising a plurality of elongated shield sections consecutively arranged in end to end overlapping relationship, each of said shields being of substantially inverted U-shape in cross-section, lugs depending from the upper parts of one end of each of said shields, said shields having slots in the other ends thereof, said lugs extending into said slots, said lugs having apertures therein, and a messenger cable extending through said apertures to support said shields while lockingly holding said shields in overlapping relationship.

2. A cable protector comprising a plurality of elongated shield sections consecutively arranged in end to end overlapping relationship, each of said shields being of substantially inverted U-shape in cross-section, lugs depending from the upper parts of one end of each of said shields, said shields having slots in the other ends thereof, said lugs extending into said slots, aligned openings in the lower portions of each of said shields, arcuate supporting members engaged in and extending between said aligned openings, said supporting members being adapted to support cables, said supporting members provided with reduced neck portions and headed ends, said ends extending outwardly of said openings with said neck portions in said openings, said lugs having apertures therein, and a messenger cable extending through said apertures to support said shields while lockingly holding said shields in overlapping relationship.

References Cited in the file of this patent

UNITED STATES PATENTS

| | | |
|---|---|---|
| 1,189,208 | Hodkinson | June 27, 1916 |
| 1,967,134 | Short | July 17, 1934 |
| 2,451,004 | Van Antwerp | Oct. 12, 1948 |